(No Model.)
S. FUNK.
HARNESS.
No. 292,742.
Patented Jan. 29, 1884.
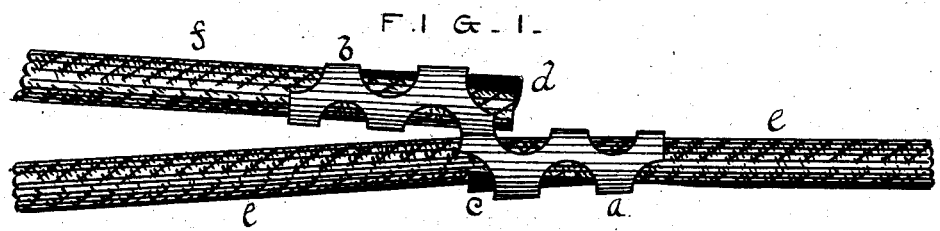
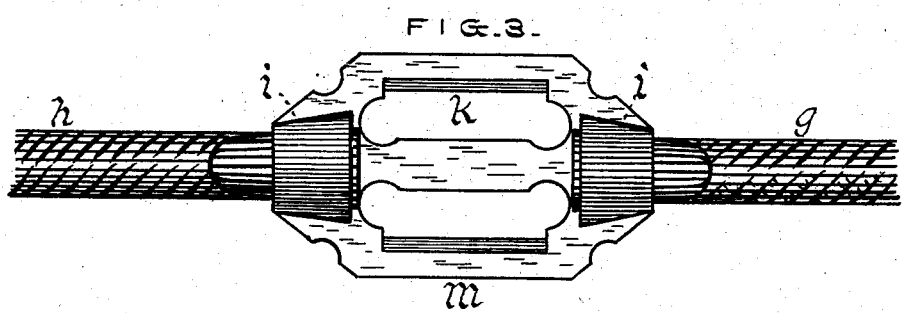
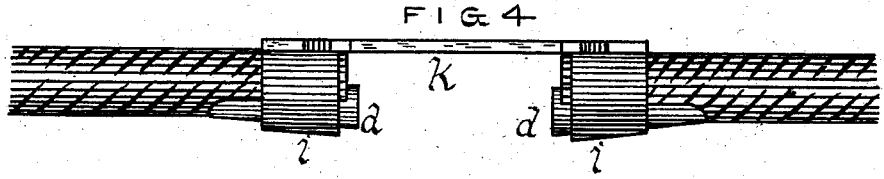
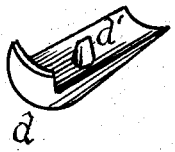
Witnesses
Frank Williams
John Tyler
Inventor
Samuel Funk.
By L. P. Graham.
atty

UNITED STATES PATENT OFFICE.

SAMUEL FUNK, OF DECATUR, ILLINOIS.

HARNESS.

SPECIFICATION forming part of Letters Patent No. 292,742, dated January 29, 1884.

Application filed November 26, 1883. (No model.)

*To all whom it may concern:*

Be it known that I, SAMUEL FUNK, a resident of the city of Decatur, county of Macon, and State of Illinois, have invented certain new and useful Improvements in Harness, of which the following is a specification sufficiently full, clear, and exact to enable any one skilled in the art to which it relates to make and use the same.

The object of my invention is to enable farmers and others having no special knowledge of harness-making to construct cheap rope harness for common use.

It is now possible to procure collars, hames, straps, clips, and buckles; and to make it convenient to combine the above-mentioned parts to produce a complete harness I have invented the devices hereinafter set forth by reference to the accompanying drawings, in which—

Figure 1 shows a device for securing the check to the main line. Figs. 3 and 4 represent a device for connecting the tug, hame-tug, back-band, and belly-band, while Figs. 2 and 5 show different forms of the wedge used to secure the rope to the castings.

$a$ $b$ show a pair of tubular receptacles in rigid contact.

$e$ represents the main line, and $f$ the check. $c$ and $d$ show wedges for securing the line and check in position in receptacles $a$ $b$.

Fig. 4 is an edge view of Fig. 3, and the letters in each refer to parts as follows:

$i$ $i$ are annular receptacles that hold the ends of the tug and hame-tug.

$k$ $m$ are bars that serve to connect the receptacles $i$ $i$, and at the same time afford points of attachment for the back-band and belly-band.

$c$ in Fig. 2 and $d$ in Fig. 5 show different forms of the wedge; but the projection $c'$ $d'$ is similar in each.

The use of the wedge in all cases is similar, and consists in inserting projection $c'$ $d'$ in a strand of the rope, after which both rope and wedge are drawn into position in the receptacles.

When desired, the tug and hame-tug may be in one piece, and in that case the rope will pass through both receptacles $i$ $i$ and the wedges be utilized to hold the bars in proper position to receive the belly-band and back-band.

I claim as new and desire to secure by Letters Patent—

1. In combination with two parts of a harness, the tubular receptacles and the locking-wedge, all arranged to operate substantially as shown and described.

2. The combination of receptacles $i$ $i$, bars $k$ $m$, tugs $g$ $h$, and wedges $d$ $d$, as and for the purpose set forth.

SAMUEL FUNK.

Attest:
 I. D. WALKER,
 L. P. GRAHAM.